Figure 1:
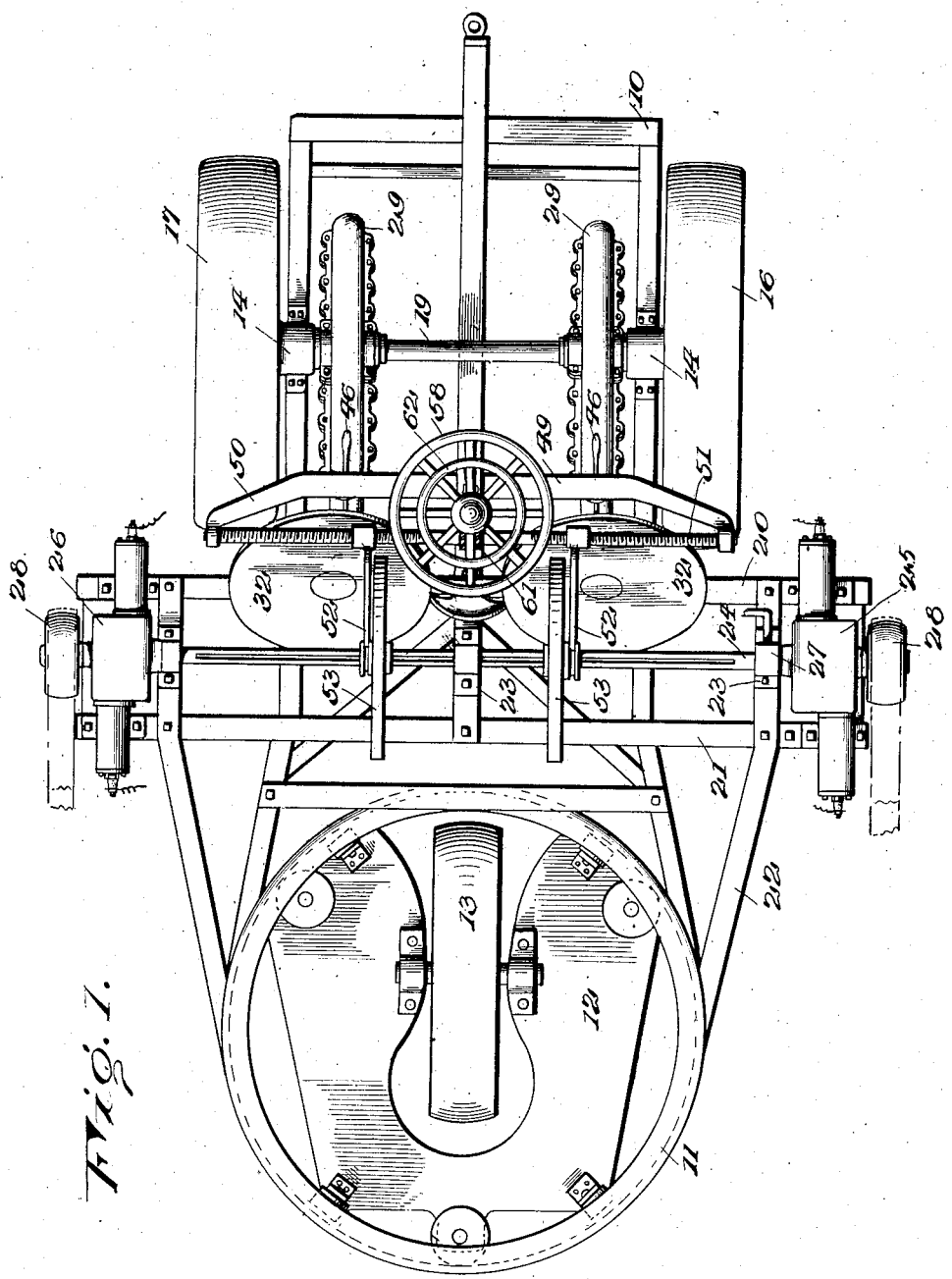

A. E. CAIN.
TRACTOR.
APPLICATION FILED SEPT. 20, 1919.

1,405,897. Patented Feb. 7, 1922.
4 SHEETS—SHEET 1.

Inventor
A. E. Cain
by Lacy & Lacy,
his Atty's.

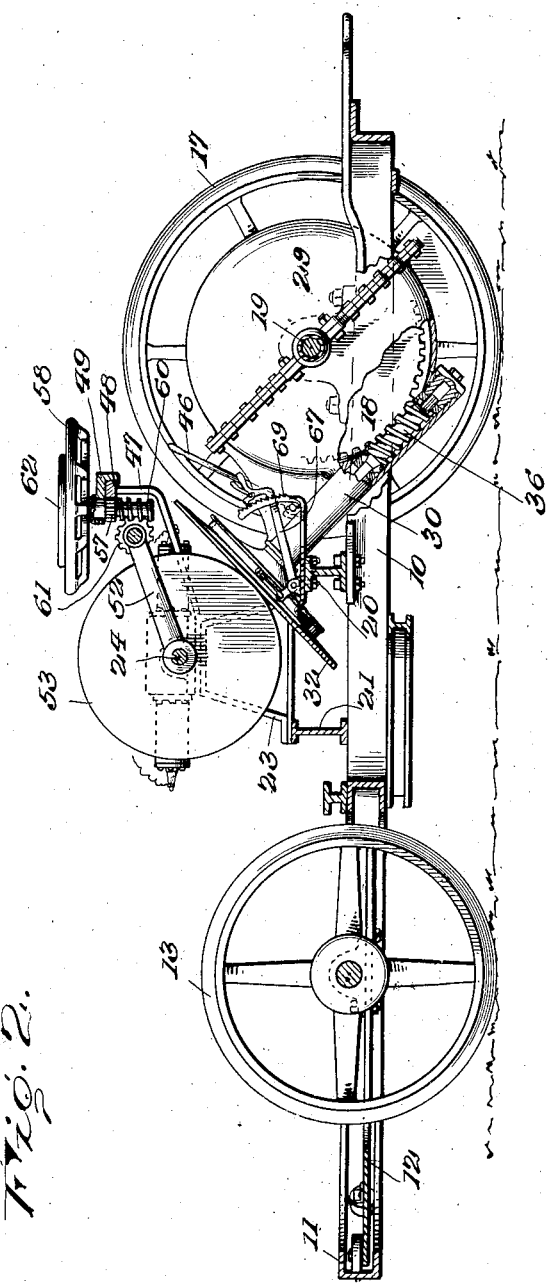

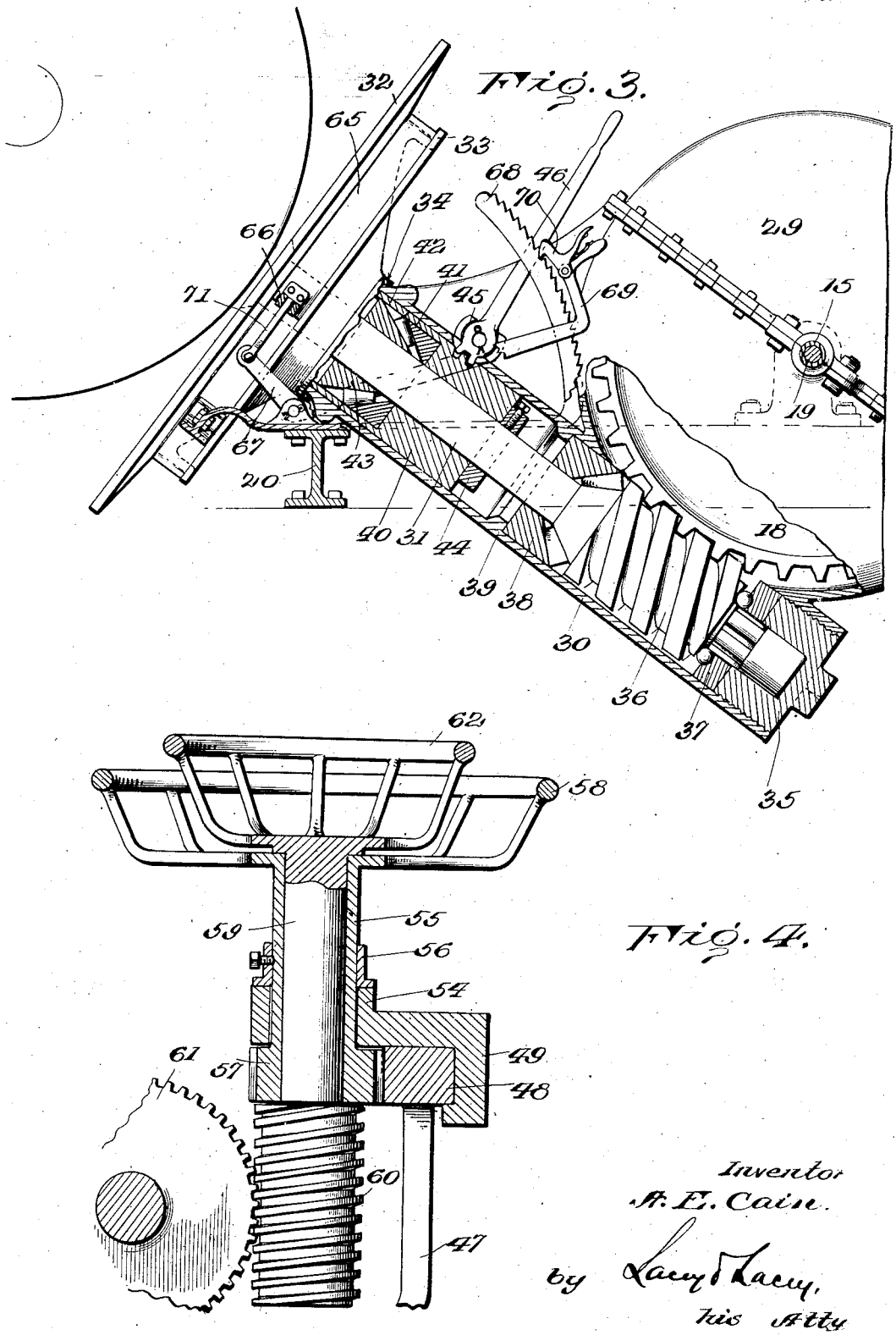

A. E. CAIN.
TRACTOR.
APPLICATION FILED SEPT. 20, 1919.

1,405,897.

Patented Feb. 7, 1922.
4 SHEETS—SHEET 4.

Inventor.
A. E. Cain
by his Lacey & Lacey, Atty's ial No. 325,064.

UNITED STATES PATENT OFFICE.

ALVAH E. CAIN, OF PHILIPSBURG, MONTANA.

TRACTOR.

1,405,897.

Specification of Letters Patent. Patented Feb. 7, 1922.

Application filed September 20, 1919. Serial No. 325,064.

*To all whom it may concern:*

Be it known that I, ALVAH E. CAIN, citizen of the United States, residing at Philipsburg, in the county of Granite and State of Montana, have invented certain new and useful Improvements in Tractors, of which the following is a specification.

This invention relates to an improved tractor and has as one of its principal objects to provide a tractor which will prove thoroughly efficient in practical use but which will be characterized by extreme simplicity in all its structural details.

The invention has as a further object to provide a tractor employing separate engines in connection with the power shaft thereof whereby different power ratings may be obtained for propelling the tractor or for belt work.

The invention has as a still further object to provide a tractor which may be guided by the motive power thereof, dispensing with the usual steering mechanism.

A further object of the invention is to provide a tractor having a drive mechanism wherein the use of spur or bevel gears will be eliminated to thus avoid the destructive wear and vibration incident thereto.

And the invention has as a still further object to provide a tractor which will be equipped with easily manipulated mechanism for guiding the tractor or changing the speed thereof.

Other and incidental objects will appear hereinafter.

Figure 5:
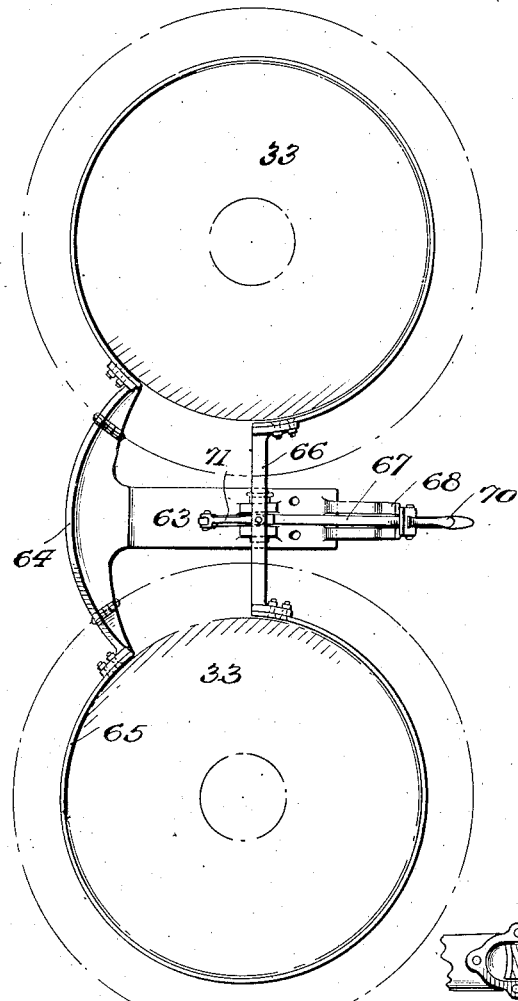
Figure 6:
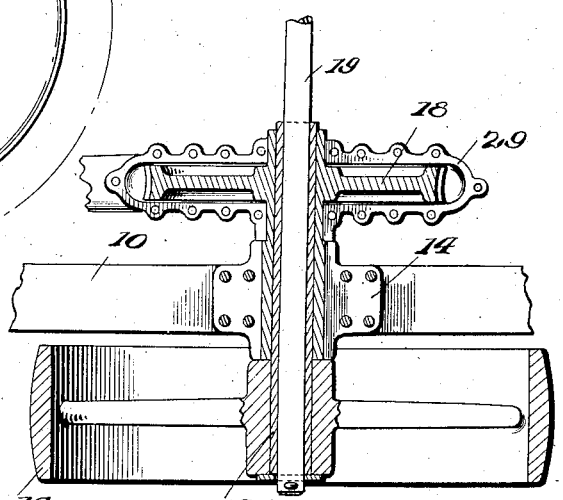

In the drawings:

Figure 1 is a plan view of my improved tractor,

Figure 2 is a longitudinal sectional view of the tractor, parts being shown in elevation, Figure 3 is a sectional view illustrating one of the drive shafts of the tractor, Figure 4 is a fragmentary sectional view showing the speed control and steering shaft of the device, Figure 5 is a detail plan view showing the brake mechanism employed, and Figure 6 is a detail sectional view particularly illustrating the mounting of the drive wheels.

In carrying the invention into effect, I employ a frame or chassis 10, at the front end of which is arranged a channeled annulus 11 carrying a turn table 12. The turn table is equipped with a plurality of suitable supporting rollers engaging within the channel of the annulus and mounted upon the turn table is a pilot wheel 13. Mounted upon the frame near its rear end are suitable bearings 14 through which are received, as particularly shown in Figure 6, sleeves 15. At their outer end portions these sleeves carry the drive wheels which, for convenience, have been indicated at 16 and 17 respectively and fixed to the inner end portions of said sleeves are worm wheels 18. Loosely fitted through the sleeves is the rear axle shaft 19 of the tractor, this shaft being mounted to turn with the drive wheels for reducing friction.

Extending transversely of the frame in the rear of the annulus 11 are spaced parallel sills 20 and 21 respectively, held at their outer end portions by braces 22 extending between the sills and the annulus. Upstanding from these sills are spaced brackets 23 and journaled through suitable bearings upon the brackets is a horizontal power shaft 24. Mounted at one end of said shaft is an engine 25 of approved type which is preferably of ten horse power and mounted at the opposite end of said shaft is a similar engine 26 which is preferably of fifteen horse power. The engine 26 is permanently connected with the shaft. However, a suitable clutch 27 is employed in connection with the engine 25 so that this latter engine may be either coupled with or uncoupled from the shaft. At each end the power shaft carries a pulley 28. Thus, for belt work, the engine 25 may be employed alone for driving the power shaft or this engine may be allowed to idle and the engine 26 used alone for driving the power shaft. If more power is desired, both engines may be employed simultaneously for driving the shaft. In this way, three power ratings may be had for belt work.

Surrounding the worm wheels 18 are sectional housings 29 with which are integerally formed cylindrical casings 30 secured at their upper end portions to the sill 20, these casings inclining drawnwardly and rearwardly beneath the worm wheels and being supported at their rear end portions by the housings Journaled, as particularly shown in Figure 3, in these casings are drive shafts 31 carrying, at their upper ends, friction discs 32. These discs are provided with brake drums 33 from which depend flanges 34 freely surrounding the upper ends of the casings. Closing the casings at their lower ends are threaded plugs 35 recessed to loosely receive the lower ends of the drive shafts and splined upon the lower end portions of said shafts are driving worms 36 coacting with the worm wheels 18. Interposed between the plugs 35 and the lower ends of the worms are anti-friction bearings 37 while at the upper ends of said worms are arranged roller bearings 38 held by annular shoulders 39 within the casings. Surrounding the drive shafts above the shoulders 39 are sleeves 40 provided at their upper ends with flanges 41 and seated against these flanges are rings 42. Disposed within said flanges and rings are roller bearings 43 held between the sleeves 40 and the inner ends of the friction discs. These bearings 43 while thus rotatably supporting the drive shafts 31 will also hold the sleeves against upward movement and adjustably fixed upon the shafts below the sleeves are collars 44 holding the sleeves against downward movement. Rising from the upper end portions of the casings 30 are sockets 45 and pivoted in said sockets are shifting levers 46 provided at their inner ends with teeth coacting with teeth upon the sleeves 40. Thus, as will be clear, the levers 46 may be operated for sliding the drive shafts 31 through the worms 36 to either elevate or lower the friction discs 32.

Connected to the intermediate one of the brackets 23 is, as particularly shown in Figures 1 and 2, an arm 47 extending rearwardly and upwardly with respect to said bracket and integrally formed on or otherwise secured to the upper end of this arm is a horizontal rack bar 48 lying parallel to the power shaft 24. Slidable longitudinally upon said bar is a channeled yoke 49 the end portions of which are formed with forwardly directed arms 50 and journaled at its ends upon these arms is a reversely threaded screw shaft 51 also lying parallel to the power shaft. Threaded at their inner ends upon the opposite end portions of the shaft 50 are arms 52 freely engaged at their outer ends with the hubs of friction wheels 53 splined upon the power shaft. At a point substantially midway between its ends the yoke 49 is, as particularly shown in Figure 4, provided with a bearing 54 through which is journaled a hollow steering shaft 55 supported by a collar 56. At its lower end this shaft is provided with a pinion 57 coacting with the rack bar 48 while at the upper end of said shaft is arranged a hand wheel 58. Journaled through the shaft 55 is a speed control shaft 59 provided at its lower end with a screw 60 coacting with a pinion 61 upon the shaft 51. At the upper end of the shaft is formed or otherwise provided a hand wheel 62.

Suitably fixed upon the sill 20 in a plane between the discs 32 is, as particularly shown in Figures 2 and 5, a plate 63 at the forward end of which is formed a head 64. Secured at corresponding ends thereof to this head are flexible brake bands 65 extending around the brake drums 33 of the discs and connected at the opposite ends thereof to a coupling arm 66 lying in the rear of the head. Mounted to rock upon the plate 63 beneath said arm is a bell crank 67, the long arm of which is freely received between arcuate rack posts upstanding from the plate near its rear end. As clearly shown in Figure 3, the long arm of the crank is provided at its rear end with an upwardly directed terminal 69 provided with a handle and upon which is pivoted a catch 70 to cooperate with the rack posts. Connecting the shorter arm of the bell crank with the coupling arm 66 is a link 71. Thus, as will be clear, by lifting the rearwardly projecting long arm of the bell crank, the brake bands 65 will be tightened about the brake drums of the friction discs for braking the tractor.

As will now be readily understood in view of the preceding description, the levers 46 may be operated for shifting the friction discs 32 into or out of engagement with the friction wheels 53 for either coupling the drive shafts 31 with the power shaft 24 for propelling the tractor or uncoupling the drive shafts from said power shaft. One of the worm wheels 18 and its driving worm 36 are threaded in a direction opposite to the other worm wheel and its driving worm. Consequently, when the friction wheels 53 are disposed to coact with the friction discs 32, as shown in Figure 1, the tractor will be driven forwardly and, as will be clear, as long as the friction wheels occupy the same relative position with regard to the axis of the friction discs respectively, the tractor will be driven straight ahead. However, as will be observed, the hand wheel 58 may be rotated for sliding the yoke 49 along the rack bar 48 and consequently simultaneously shifting both of the friction wheels with respect to the axes of the friction discs without affecting the position of the wheels with respect to each other. Therefore, by shifting the friction wheels in the direction of the axis of one disc and away from the axis of the other disc, the drive wheel 16 may, for instance, be caused to revolve slower while the drive wheel 17 will be caused to revolve proportionately faster. On the other hand, by shifting the friction wheels in the opposite direction, the drive wheel 17 may be caused to revolve slower and the drive wheel 16 caused to revolve proportionately faster. In this way, the tractor may be readily directed by its motive power, the pilot wheel 13 being adapted, of course, to conform to the direction in which the tractor is propelled. If desired, either friction wheel may be shifted clear of its coacting friction disc while the other friction wheel will engage its friction disc so that sharp turns may be made. By rotating the hand wheel 62 the friction wheels may be further manipulated independently of their simultaneous movement in the same direction. Rotation of this hand wheel will, as will be readily understood in view of the preceding description, serve, when the hand wheel is turned in one direction, to simultaneously shift the friction wheels inwardly toward each other and, when the hand wheel is turned in the opposite direction, to simultaneously shift said wheels outwardly away from each other. Thus, the friction wheels may be spread apart so as to coact with the friction discs near the axes thereof when the tractor will be driven slowly. On the other hand, by shifting the friction wheels inwardly to coact with the marginal portions of the discs, the speed of the tractor may be accelerated. Thus, the speed of the tractor may be readily controlled without varying the speed of the power shaft. By bringing the wheels inwardly toward each other so as to clear the friction discs, the tractor may be stopped without stopping the engines of the tractor while by separating the friction wheels so that said wheels will coact with the discs at points lying outwardly beyond the axes of the discs, the tractor may be reversed. It will accordingly be seen that I provide, in each instance, a particularly simple and at the same time efficient type of tractor driving and controlling mechanism.

Having thus described the invention, what is claimed as new is:

1. A power driven vehicle including a power shaft, independently rotatable drive wheels, drive shafts coupled with said wheels respectively, friction discs carried by said drive shafts, friction wheels upon the power shaft adapted to coact with the discs, means coupled with the friction wheels for simultaneously shifting both of said wheels in the same direction with respect to the discs, means slidably supporting the first means, and means coacting between the first and second means and operable for slidably shifting the first means.

2. A power driven vehicle including a power shaft, independently rotatable drive wheels, drive shafts coupled with said wheels respectively, friction discs carried by said drive shafts, friction wheels splined upon the power shaft and adapted to coact with the discs, a yoke, means slidably supporting the yoke, an operative connection between the yoke and the friction wheels and means coacting between the first means and said yoke and operable for slidably shifting said yoke whereby to simultaneously shift the friction wheels transversely in the same direction with respect to the discs.

3. A power driven vehicle including a power shaft, independently rotatable drive wheels, drive shafts coupled with said wheels respectively, friction discs carried by the drive shafts, friction wheels splined on the power shaft, a yoke, a rotatable shaft carried by the yoke, an operative connection between the latter shaft and said friction wheels, means for shifting the yoke whereby to simultaneously shift the friction wheels in the same direction with respect to the discs, and a control shaft for rotating the shaft of the yoke whereby to simultaneously shift the friction wheels with respect to each other and accordingly vary their position with respect to the discs.

4. In a power driven vehicle, a power shaft, drive shafts, friction discs carried by said drive shafts, friction wheels splined upon the power shaft and adapted to coact with said discs, a rack bar, a yoke slidable upon said bar, an operative connection between the yoke and said wheels, and a pinion carried by the yoke and coacting with said bar, the pinion being rotatable for shifting the yoke whereby to simultaneously shift the wheels in the same direction with respect to said discs.

5. In a power driven vehicle, a power shaft, friction wheels splined thereon, drive shafts, friction discs carried by said drive shafts, a yoke, a reversely threaded shaft carried by the yoke, arms engaging the reversely threaded portions of the shaft respectively and coupled to said wheels, and a control shaft carried by the yoke for turning the reversely threaded shaft whereby to shift the wheels with respect to each other and accordingly vary their position with respect to said discs.

6. In a power driven vehicle, a power shaft, friction wheels splined thereon, drive shafts, friction discs carried by said drive shafts, a rack bar, a yoke slidable upon the bar, a reversely threaded shaft carried by the yoke, arms engaging the reversely threaded portions of such shaft respectively and coupled to the friction wheels, a shaft rotatable upon the yoke and provided with a pinion coacting with the rack bar whereby the yoke may be shifted to simultaneously shift said wheels in the same direction with respect to the discs, and a second shaft rotatable upon the yoke and operatively coupled with the reversely threaded shaft whereby such shaft may be rotated for simultaneously shifting the wheels with respect to each other and accordingly varying their position with respect to the discs.

7. A power driven vehicle including a power shaft, independently rotatable drive wheels, drive shafts coupled with said wheels respectively, friction discs carried by said drive shafts and provided with brake drums and having corresponding ends thereof fixed, brake bands surrounding the drums, a coupling arm connected to the opposite ends of the bands, means for shifting said arm and tightening the bands about the drums, and friction wheels mounted upon the power shaft and adapted to respectively cooperate with the friction discs.

8. A power driven vehicle including a power shaft, independently rotatable drive wheels, drive shafts coupled with said wheels respectively, friction discs carried by said drive shafts, friction wheels splined upon the power shaft and adapted to coact with the discs, slidable means for simultaneously shifting the wheels in the same direction transversely with respect to the discs, means slidably supporting the first means, and rotatable means coacting between the first and second means and operable for slidably shifting the first means.

9. In a power driven vehicle, a power shaft, drive shafts, friction discs carried by the drive shafts, friction wheels splined upon the power shaft and adapted to coact with said discs, slidable means for simultaneously shifting the wheels in the same direction transversely with respect to the discs, rotatable means for shifting the wheels with respect to each other, a shaft journaled upon said slidable means and rotatable for slidably shifting such means, and a second shaft journaled through the first shaft and rotatable for turning said rotatable means.

In testimony whereof I affix my signature.

ALVAH E. CAIN. [L. S.]